(12) United States Patent
Jeyapaul et al.

(10) Patent No.: US 9,288,178 B2
(45) Date of Patent: *Mar. 15, 2016

(54) INVENTORY UPDATING OF AN INTERNET PROTOCOL (IP) ALIAS WITHIN A HIGHLY AVAILABLE COMPUTING CLUSTER

(75) Inventors: Rajesh K. Jeyapaul, Bangalore (IN); Alfredo V. Mendoza, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 35 days.

This patent is subject to a terminal disclaimer.

(21) Appl. No.: 13/524,957

(22) Filed: Jun. 15, 2012

(65) Prior Publication Data

US 2013/0159488 A1 Jun. 20, 2013

Related U.S. Application Data

(63) Continuation of application No. 13/326,222, filed on Dec. 14, 2011.

(51) Int. Cl.
*G06F 15/16* (2006.01)
*G06F 15/173* (2006.01)
*H04L 29/12* (2006.01)
*G06F 11/20* (2006.01)

(52) U.S. Cl.
CPC ........ *H04L 61/2007* (2013.01); *H04L 61/2076* (2013.01); *G06F 11/2035* (2013.01)

(58) Field of Classification Search
CPC ... H04W 64/003; H04W 64/00; H04W 12/06; H04W 36/12; H04W 80/04; H04W 8/26; H04W 28/0247; H04W 40/00; H04W 40/32; H04L 12/66; H04L 63/101; H04L 12/4641; H04L 12/4679; H04L 29/12009; H04L 29/12018; G06F 12/1027
USPC .................................................. 709/200, 223
See application file for complete search history.

(56) References Cited

U.S. PATENT DOCUMENTS

| | | | | |
|---|---|---|---|---|
| 6,029,196 A | * | 2/2000 | Lenz | 709/221 |
| 6,061,332 A | * | 5/2000 | Branton et al. | 370/241 |
| 6,430,622 B1 | * | 8/2002 | Aiken et al. | 709/245 |
| 7,454,489 B2 | * | 11/2008 | Chauffour et al. | 709/223 |

(Continued)

FOREIGN PATENT DOCUMENTS

WO WO 0217111 A1 * 2/2002

*Primary Examiner* — Glenton B Burgess
*Assistant Examiner* — Imran Moorad
(74) *Attorney, Agent, or Firm* — Steven M. Greenberg, Esq.; CRGO Law

(57) ABSTRACT

A clustered computing data processing system can be configured for inventory management in a highly available cluster. The system can include a cluster of computers managed by a cluster agent and providing high availability for a hosted application in the cluster. The system also can include a systems management tool executing in memory of a host computer system and coupled to the cluster agent and maintaining an inventory of data pertaining to the computers in the cluster. The system yet further can include an Internet protocol (IP) alias discover module coupled to the tool. The module can include program code executing in the memory of the host computer system so as to receive notification from the cluster agent of a change to addressing data for the computers in the cluster and, responsive to the notification, to update the inventory to reflect the change to the addressing data.

6 Claims, 2 Drawing Sheets

(56) References Cited

U.S. PATENT DOCUMENTS

| | | | |
|---|---|---|---|
| 8,176,364 B1* | 5/2012 | Havemose | 714/15 |
| 8,364,801 B2* | 1/2013 | Cerami et al. | 709/223 |
| 2001/0034852 A1* | 10/2001 | Kawashima | 714/4 |
| 2002/0178265 A1* | 11/2002 | Aiken et al. | 709/227 |
| 2002/0194385 A1* | 12/2002 | Linder et al. | 709/250 |
| 2005/0013280 A1* | 1/2005 | Buddhikot et al. | 370/349 |
| 2005/0038772 A1* | 2/2005 | Colrain | 707/1 |
| 2005/0159927 A1* | 7/2005 | Cruz et al. | 702/188 |
| 2006/0161637 A1* | 7/2006 | Friess et al. | 709/218 |
| 2008/0288654 A1* | 11/2008 | Matuszewski et al. | 709/238 |
| 2009/0157882 A1* | 6/2009 | Kashyap | 709/227 |
| 2009/0287955 A1* | 11/2009 | Matsumoto et al. | 714/4 |
| 2010/0023593 A1* | 1/2010 | Matsuo | 709/207 |
| 2010/0070623 A1* | 3/2010 | Sawada | 709/224 |
| 2010/0293269 A1* | 11/2010 | Wilson et al. | 709/224 |
| 2012/0278801 A1* | 11/2012 | Nelson et al. | 718/1 |
| 2012/0311693 A1* | 12/2012 | Horman et al. | 726/14 |

* cited by examiner

INVENTORY UPDATING OF AN INTERNET PROTOCOL (IP) ALIAS WITHIN A HIGHLY AVAILABLE COMPUTING CLUSTER

CROSS-REFERENCE TO RELATED APPLICATIONS

This application is a Continuation of U.S. application Ser. No. 13/326,222, filed Dec. 14, 2011, currently pending, the entirety of which is incorporated herein by reference.

BACKGROUND OF THE INVENTION

1. Field of the Invention

The present invention relates to high availability in a network architecture and more particularly to inventory management in a clustered computing environment.

2. Description of the Related Art

Computing clusters have become common in the field of high-availability and high-performance computing. Cluster-based systems exhibit three important and fundamental characteristics or properties: reliability, availability and serviceability. Each of these features are of paramount importance when designing the software and the hardware of a new robust clustered system. As opposed to the symmetric multi-processing (SMP) systems whose scalability can be limited and which can result in substantially diminished returns upon the addition of processors to the system, a clustered-based system consists of multiple computing nodes coupled to one another over high-speed communicative linkages. Each node in the cluster enjoys its own memory address space, possibly its own disk space and it hosts its own local operating system. Thus, each computing node within the cluster system can be viewed as a processor-memory module that cooperates with other nodes such that it can provide system resources and services to user applications.

Clusters can be characterized by increased availability since the failure of a particular computing node does not affect the operation of the remaining computing nodes. Rather, any one failed computing node can be isolated and no longer utilized by the cluster-based system until the node can be repaired and incorporated again within the cluster. Additionally, the load of a failed computing node within a cluster can be equitably shared among the functional nodes of the cluster. Thus, clusters have proven to be a sensible architecture for deploying applications in the distributed environment and clusters are now the platform of choice in scalable, high-performance computing.

When a cluster of computing nodes is configured for high availability, the network configuration for each node ordinarily includes a boot IP address and a service IP address. The boot IP address refers to the network interface of the computing node at which the computing node is accessed. The service IP address, in turn, refers to the IP address at which a service executing within the computing node can be accessed. In the latter instance, then, the service IP address acts as an alias to a boot IP address of one of the computing nodes in the cluster supporting the current execution of the service. As such, in a failover condition of a computing node supporting the current execution of the service, the service IP of the service can be changed to alias a different computing node in the cluster that has not failed.

When first establishing a highly available computing environment, oftentimes the centralized management platform charged with managing the computing environment takes "inventory" of the different computing systems intended to form a computing cluster. The inventory generated by the management platform, however, occurs prior to the initialization and execution of the clustered computing application charged with creating and configuring a cluster of nodes utilizing the different computing systems managed by the platform. Consequently, the inventory lacking the relevant boot IP and service IP addresses for the computing nodes will be incomplete requiring manual intervention by a human. Likewise, after a failover condition has arisen in the clustered computing environment, the inventory of the management platform will be incorrect with respect to the service IP addresses that will have changed as a result of the failover condition to alias a different boot IP address of a different node.

In both instances, tedious manual intervention will be required. Alternatively, the management platform can be configured to periodically update the inventory, however, each update consumes precious computing resources and will not be required absent a failover condition. The periodicity of such periodic updating of the inventory can be tuned to minimize the unnecessary consumption of processing resources, however, to do so creates the risk that a period of time will subsist during which the inventory will be incorrect subsequent to a failover condition.

BRIEF SUMMARY OF THE INVENTION

Embodiments of the present invention address deficiencies of the art in respect to highly available cluster management and provide a novel and non-obvious method, system and computer program product for inventory management in a highly available cluster. In an embodiment of the invention, a method for inventory management in a highly available cluster is provided. The method includes creating an inventory of computers in a cluster by a systems management tool executing in memory of a host computing system. The method also includes receiving notification in the systems management tool from the cluster of a change to addressing data, for example a service IP, for computers in the cluster. Finally, the method includes, in response to the notification, updating the inventory by the systems management tool to reflect the change to the addressing data.

Of note, the inventory can be created prior to initializing the cluster and the inventory can be updated subsequent to the initializing of the cluster. Likewise, the inventory can be created prior to initializing the cluster and the inventory can be updated subsequent to the initializing of the cluster and also subsequent to a failover condition in the cluster. In one aspect of the embodiment, the addressing data includes both a boot IP and also an alias IP for a hosted application supported by the cluster. In another aspect of the embodiment, receiving notification in the systems management tool from the cluster of a change to addressing data for computers in the cluster includes detecting a change in status of a flag by the cluster. In this regard, the flag status is based on the hash value of the addressing data maintained by the system management tool agent which interacts with the cluster agent.

In another embodiment of the invention, a clustered computing data processing system can be configured for inventory management in a highly available cluster. The system can include a cluster of computers managed by a cluster agent and providing high availability for a hosted application in the cluster. The system also can include a systems management tool executing in memory of a host computer system and coupled to the cluster agent and maintaining an inventory of data pertaining to the computers in the cluster. The system yet further can include an IP alias discover module coupled to the tool. The module can include program code executing in the memory of the host computer system so as to receive notification from the cluster agent of a change to addressing data for the computers in the cluster and, responsive to the notification, to update the inventory to reflect the change to the addressing data.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for inventory management in a highly available cluster. In accordance with an embodiment of the invention, a systems management tool can construct an inventory of clusters to be managed as part of a highly available clustered computing environment. Thereafter, a notification can be received from a cluster service managing high availability in the cluster that a change in a service address alias has occurred such as once the clustered computing environment has been initialized or subsequent to a failover condition in the clustered computing environment. In response to the receipt of the notification, the systems management tool can update the inventory of clusters with correct service address alias data for the clusters thereby assuring an accurate inventory without consuming systems resources through periodic querying of the clusters to update the inventory.

Figure 1:
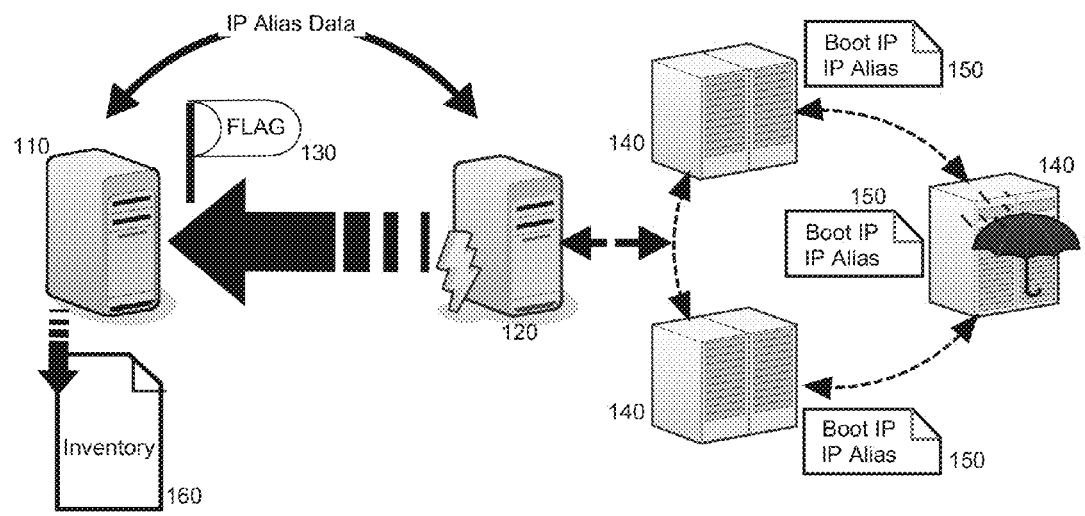
FIG. 1 is a pictorial illustration of a process for inventory management in a highly available cluster.

In further illustration, FIG. 1 pictorially shows a process for inventory management in a highly available cluster. As shown in FIG. 1, a systems management tool 110 can manage individual computers 140 in a cluster 120. The cluster 120 can maintain high availability amongst the computers 140 including addressing failover conditions when one of the computers 140 in the cluster 120 fails so as a supported service can be provided by another of the computers 140 in the cluster 120. To that end, each of the computers 140 can include addressing data 150 including a boot IP address and an alias IP for the supported service referring to an address of one of the computers 140 contemporaneously charged with servicing requests to utilize the service.

Of note, the systems management tool 110 can maintain an inventory 160 of the addressing data 150 for each of the computers 140 in the cluster 120. In order to maintain an accurate inventory 160, the systems management tool 110 can update the inventory 160 with the addressing data 150 in response to detecting a flag 130 set by the cluster 120. In this regard, the cluster 120 can set the flag 130 at first when the cluster 120 is initialized and the alias IP information of the addressing data 150 becomes known, or in response to a failover condition for one of the computers 140 as the alias IP information of the addressing data 150 changes. Consequently, the inventory 160 can remain accurate without requiring the systems management tool 110 to periodically and constantly poll the cluster 120 for accurate addressing information 150.

Figure 2:
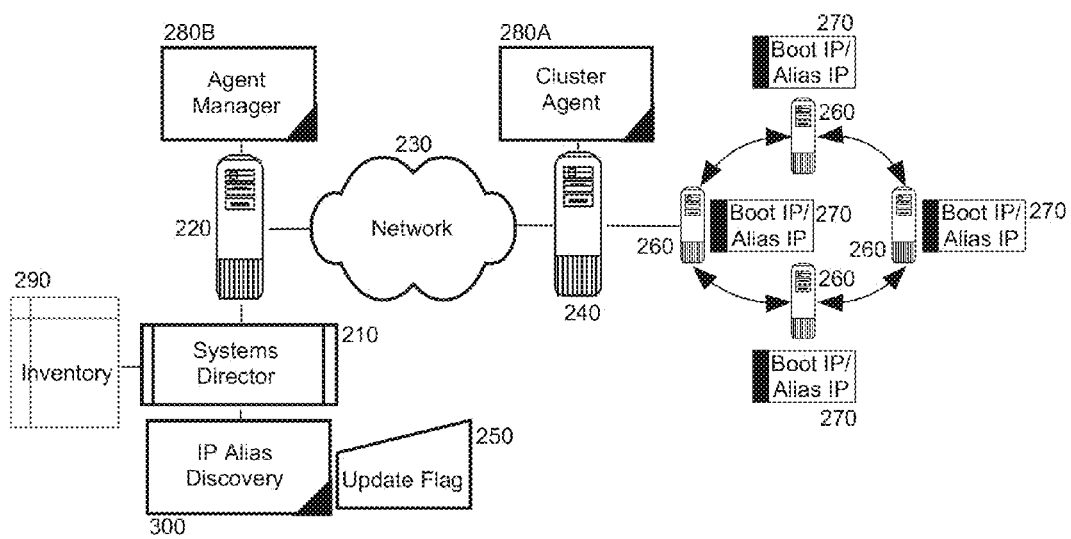
FIG. 2 is a schematic illustration of a clustered computing data processing system configured for inventory management in a highly available cluster; and, FIG. 3 is a flow chart illustrating a process for inventory management in a highly available cluster.

The process described in FIG. 1 can be implemented within a clustered computing data processing system. In further illustration, FIG. 2 schematically shows a clustered computing data processing system configured for inventory management in a highly available cluster. The system can include host computer systems 220 and 240 communicatively coupled to one another over computer communications network 230. Each of the computer systems 220 and 240 can include one or more computers each with at least one processor and memory and configured to support the execution of one or more computer programs in memory.

The host computer system 240 can be coupled to a cluster of computers 260 and can support the operation of a cluster agent 280A. The cluster agent 280A can establish a highly available clustered computing environment amongst the computers 260 by responding to failover conditions amongst the computers 260 to ensure that a hosted application executing in the computers 260 remains accessible to outside requestors. To that end, each of the computers 260 in the cluster can include addressing data 270 including not only a boot IP address, but also an alias IP address of a hosted application contemporaneously servicing outside requests.

The host computer system 220, in turn, can support the execution of a systems management tool 210 providing management operations in support of managing each individual one of the computers 260 in the cluster as well as network components and services. As part of the management operations, the systems management tool 210 can maintain an inventory of 290 of the computers 260 including corresponding addressing data 270. To maintain an accurate and up to date form of the addressing data 270 in the inventory 290, IP alias discovery module 300 can be coupled to the systems management tool 210.

The IP alias discovery module 300 can include program code that when executed in memory of a computer in host computer system 220, can monitor a corresponding update flag 250 indicating when a change has occurred in the cluster of computers 260 to the addressing information 270—namely a change in IP alias data. Correspondingly, an agent manager 280B executing in memory of the host computing system 220 can change the state of the flag 250 upon determining a change in the cluster through communications with the cluster agent 280A. Of note, the update flag 250 can, get the communication of change in addressing data 270 through a hash value maintained at agent manager 280B which is notified through cluster agent 280A, such that a change in the addressing data 270 necessarily results in a change in the update flag 250. Upon detecting a change in state of the flag 250, the IP alias discovery module 300 can retrieve the new addressing data 270 for the cluster and the new addressing data 270 can be provided by the module 300 to the systems management tool 210 in order to update the inventory 290.

Figure 3:
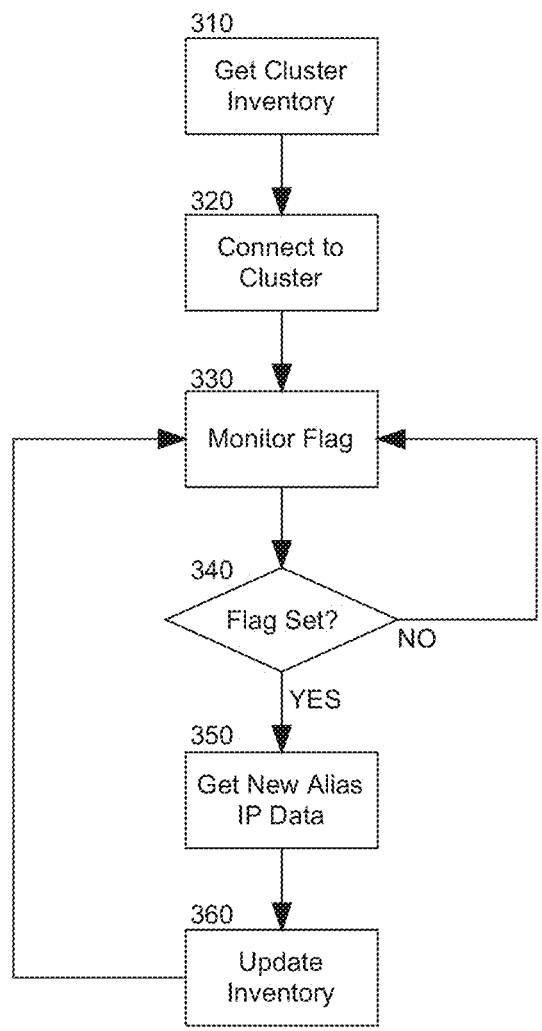

In yet further illustration of the operation of the IP alias module 300, FIG. 3 is a flow chart illustrating a process for inventory management in a highly available cluster. Beginning in block 310, an inventory can be created for computers in a cluster before the cluster has been initialized. Thereafter, subsequent to cluster initialization, in block 320 a connection can be established with a cluster agent for the cluster and in block 330, the update flag can be monitored. In decision block 340, it can be determined if a state change has occurred with respect to the update flag, such as a change in value of the update flag owing to a change of an IP alias for a hosted service or application in a computer within the cluster. If so, in block 350 new addressing data including a new IP alias can be determined for the cluster and the inventory can be updated in block 360 to reflect the new addressing data.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for inventory management in a highly available cluster, the method comprising:

creating an inventory of addressing data pertaining to computers in a cluster by a systems management tool executing in memory of a host computing system, wherein the addressing data for each computer in the cluster includes both a boot Internet Protocol (IP) address referring to a network interface of the computer at which the computer is accessed and also an alias IP address referring to a service IP address at which a service executing within the computer is accessed;

receiving notification in the systems management tool from the cluster of a change to alias IP address data for computers in the cluster by detecting a change in status of a flag by the cluster, the status of the flag being based upon a hash value of the addressing data maintained by the system management tool; and, responsive to the notification, updating the inventory by the systems management tool to reflect the change.

2. The method of claim 1, further comprising creating the inventory prior to initializing the cluster and updating the inventory subsequent to the initializing of the cluster.

3. The method of claim 1, further comprising creating the inventory prior to initializing the cluster and updating the inventory subsequent to the initializing of the cluster and also subsequent to a failover condition in the cluster.

4. The method of claim 1, wherein receiving notification in the systems management tool from the cluster of a change to addressing data for computers in the cluster, comprises detecting a change in status of a flag by the cluster.

5. The method of claim 4, wherein the notification comprises a hash value of the addressing data.

6. The method of claim 5, wherein the flag is a Boolean value indicating a necessity to update the inventory based on a change in the hash value.

\* \* \* \* \*